US012286928B2

(12) United States Patent
Takami et al.

(10) Patent No.: US 12,286,928 B2
(45) Date of Patent: Apr. 29, 2025

(54) COMPRESSED AIR SUPPLY SYSTEM (71) Applicant: KAWASAKI JUKOGYO KABUSHIKI KAISHA, Kobe (JP)

(72) Inventors: Hiroaki Takami, Kobe (JP); Naoya Sekoguchi, Kobe (JP); Katsuhiko Ishida, Kobe (JP); Kenta Umezaki, Kobe (JP); Hiroshi Sakamoto, Kobe (JP); Tatsuhiko Goi, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 20 days.

(21) Appl. No.: 18/250,920

(22) PCT Filed: Oct. 28, 2020

(86) PCT No.: PCT/JP2020/040543
§ 371 (c)(1),
(2) Date: Apr. 27, 2023

(87) PCT Pub. No.: WO2022/091276
PCT Pub. Date: May 5, 2022

(65) Prior Publication Data
US 2024/0003293 A1 Jan. 4, 2024

(51) Int. Cl.
*F02C 6/08* (2006.01)
*F02C 9/18* (2006.01)

(52) U.S. Cl.
CPC .................. *F02C 6/08* (2013.01); *F02C 9/18* (2013.01); *F05D 2210/12* (2013.01)

(58) Field of Classification Search
None
See application file for complete search history.

(56) References Cited

U.S. PATENT DOCUMENTS 5,063,963 A * 11/1991 Smith ................ F02C 6/08
137/606
5,887,445 A * 3/1999 Murry ............... B64D 13/06
62/402

(Continued)

FOREIGN PATENT DOCUMENTS

| EP | 2584172 A2 | 4/2013 |
| JP | 2006-273183 A | 10/2006 |
| JP | 2019-528213 A | 10/2019 |

*Primary Examiner* — Todd E Manahan
*Assistant Examiner* — Marc J Amar
(74) *Attorney, Agent, or Firm* — Studebaker Brackett PLLC (57) ABSTRACT

A compressed air supply system that extracts compressed air from a gas turbine engine and supplies the compressed air to an air conditioning pack of an airframe. The compressed air supply system includes: a low-pressure bleed air port that extracts compressed air from an upstream side of a high-pressure compressor; a high-pressure bleed air port that extracts compressed air from a downstream side of a front-stage portion of the high-pressure compressor; a main pipe extending from the low-pressure bleed air port toward the air conditioning pack; an auxiliary compressor that is located at the main pipe and increases pressure of the compressed air; a high-pressure bleed air pipe that couples the main pipe to the high-pressure bleed air port; a high-pressure bleed air valve located at the high-pressure bleed air pipe; and circuitry that opens the high-pressure bleed air valve when the circuitry determines that an insufficient pressure state occurs.

4 Claims, 5 Drawing Sheets

(56) References Cited

U.S. PATENT DOCUMENTS

| | | | |
|---|---|---|---|
| 8,397,487 B2* | 3/2013 | Sennoun | F02C 6/08 60/785 |
| 10,054,051 B2 | 8/2018 | Foutch et al. | |
| 2006/0174628 A1* | 8/2006 | Mikhail | B64D 13/00 60/785 |
| 2009/0196736 A1* | 8/2009 | Sengar | F02C 6/08 415/115 |
| 2009/0230243 A1* | 9/2009 | Army | B64C 7/00 244/118.5 |
| 2010/0192593 A1* | 8/2010 | Brown | F02C 7/14 701/100 |
| 2013/0040545 A1* | 2/2013 | Finney | B64D 13/06 454/71 |
| 2013/0192238 A1* | 8/2013 | Munsell | F01D 9/065 60/785 |
| 2013/0192251 A1* | 8/2013 | Munsell | F01D 11/04 60/785 |
| 2014/0250898 A1* | 9/2014 | Mackin | F02C 7/047 60/785 |
| 2015/0121842 A1* | 5/2015 | Moes | F02C 6/08 60/225 |
| 2015/0233291 A1* | 8/2015 | Pelagatti | F02C 6/08 60/785 |
| 2015/0233292 A1* | 8/2015 | Pelagatti | F02C 6/04 60/785 |
| 2015/0275769 A1* | 10/2015 | Foutch | F02C 7/047 60/776 |
| 2015/0354464 A1* | 12/2015 | Hillel | F04D 27/0261 415/144 |
| 2016/0061056 A1* | 3/2016 | Appukuttan | F01D 25/10 415/144 |
| 2018/0057172 A1* | 3/2018 | Sautron | B64D 13/06 |
| 2018/0163627 A1* | 6/2018 | Suciu | F02C 9/18 |
| 2019/0234365 A1* | 8/2019 | Kotani | F02N 9/04 |
| 2022/0195948 A1* | 6/2022 | Zafar | F02C 9/28 |
| 2023/0399111 A1* | 12/2023 | Takami | B64D 35/00 |

* cited by examiner

COMPRESSED AIR SUPPLY SYSTEM

CROSS-REFERENCE TO RELATED APPLICATIONS

This application is the U.S. National Stage of International Application No. PCT/JP2020/040543 filed Oct. 28, 2020, the entire content of which is incorporated herein by reference.

TECHNICAL FIELD

The present disclosure relates to a compressed air supply system that extracts compressed air from a gas turbine engine and supplies the compressed air to an airframe.

BACKGROUND ART

An air conditioning pack in an airframe of an aircraft adjusts the temperature and pressure of compressed air, which is supplied from a gas turbine through a compressed air supply system, to appropriate temperature and appropriate pressure and supplies the compressed air to a passenger room. The compressed air supply system can extract the compressed air having relatively high pressure. Therefore, in many cases, the compressed air supply system extracts the compressed air from a high-pressure compressor of a gas turbine engine.

However, when the compressed air extracted from the high-pressure compressor is used, the pressure of the compressed air supplied to the airframe may be higher than required pressure of the airframe depending on situations. In this case, the pressure of the compressed air needs to be reduced, and this may lead to energy loss. Therefore, proposed is a compressed air supply system which extracts compressed air having lower pressure from an upstream side of the high-pressure compressor, increases the pressure of the extracted compressed air to necessary pressure by an auxiliary compressor, and supplies the compressed air to the airframe (see PTL 1, for example).

CITATION LIST

Patent Literature

PTL 1: European Patent No. 2584172

SUMMARY OF INVENTION

Technical Problem

The above auxiliary compressor is required to have high pressure-increase performance so as to be able to deal with various situations, and therefore, the size of the auxiliary compressor tends to become large. The present disclosure was made under these circumstances, and an object of the present disclosure is to provide a compressed air supply system that can suppress the size of an auxiliary compressor.

Solution to Problem

A compressed air supply system according to one aspect of the present disclosure is a compressed air supply system that extracts compressed air from a gas turbine engine and supplies the compressed air to an air conditioning pack of an airframe. The compressed air supply system includes: a low-pressure bleed air port that extracts the compressed air from an upstream side of a high-pressure compressor; a high-pressure bleed air port that extracts the compressed air from a downstream side of a front-stage portion of the high-pressure compressor; a main pipe extending from the low-pressure bleed air port toward the air conditioning pack; an auxiliary compressor that is located at the main pipe and increases pressure of the compressed air; a high-pressure bleed air pipe that couples the main pipe to the high-pressure bleed air port; a high-pressure bleed air valve located at the high-pressure bleed air pipe; and circuitry that opens the high-pressure bleed air valve when the circuitry determines that an insufficient pressure state occurs, the insufficient pressure state being a state where with the high-pressure bleed air valve closed, outlet pressure of the main pipe is not maintained within a required pressure range of an inlet of the air conditioning pack.

According to this configuration, when it is determined that the insufficient pressure state occurs, the high-pressure bleed air valve is open, and the compressed air having high pressure is introduced from the high-pressure bleed air port. With this, the pressure of the compressed air supplied by the compressed air supply system can be maintained within an appropriate range. Therefore, according to the above configuration, the auxiliary compressor does not have to have pressure-increase performance that can deal with any situation, and therefore, the size of the auxiliary compressor can be suppressed.

Advantageous Effects of Invention

According to the above configuration, the compressed air supply system that can suppress the size of the auxiliary compressor can be provided.

DESCRIPTION OF EMBODIMENTS

Embodiment 1

Figure 1:
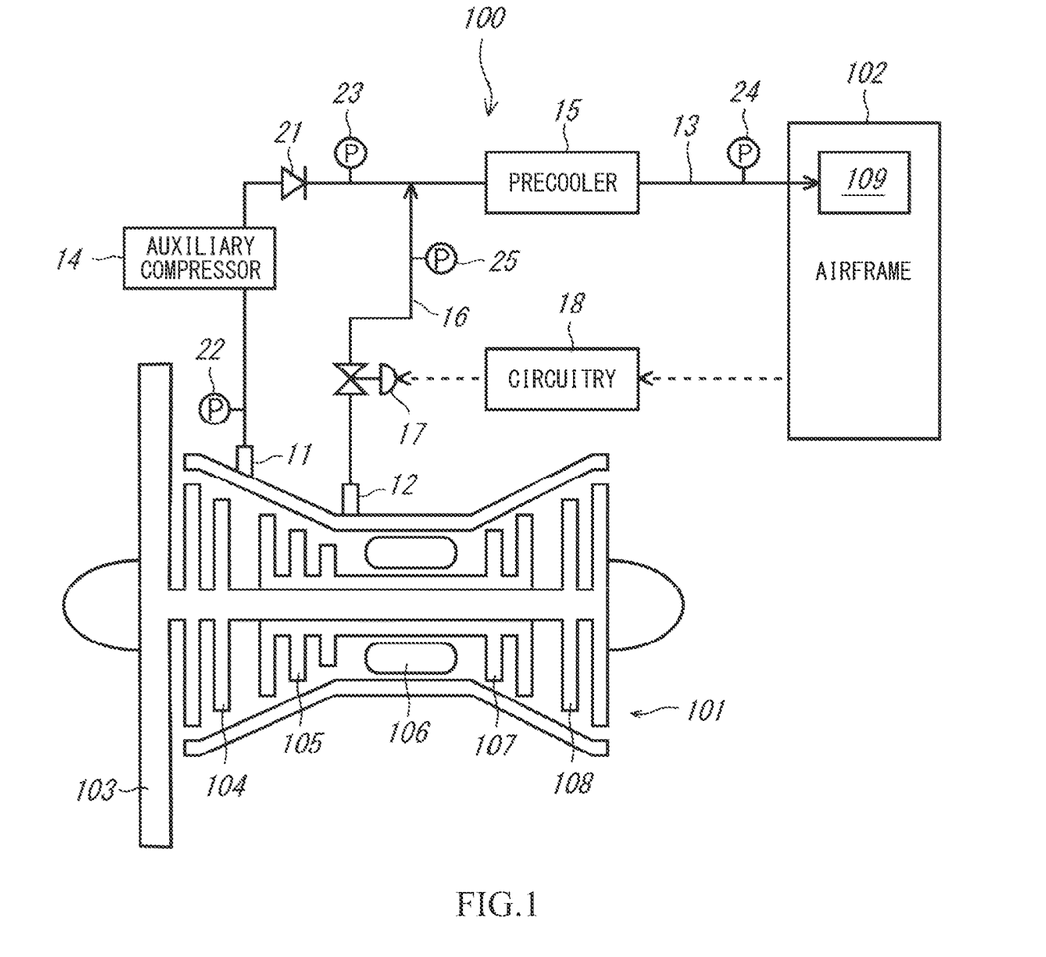
FIG. 1 is a schematic diagram showing a compressed air supply system according to Embodiment 1.

First, a compressed air supply system 100 according to Embodiment 1 of the present disclosure will be described. FIG. 1 is a schematic diagram showing the compressed air supply system 100 according to Embodiment 1. The compressed air supply system 100 is a system that extracts compressed air from a gas turbine engine 101 for an aircraft and supplies the compressed air to an airframe 102. The temperature and pressure of the compressed air supplied to the airframe 102 are adjusted to appropriate temperature and appropriate pressure by an air conditioning pack 109, and the compressed air is supplied to a passenger room by the air conditioning pack 109. Examples of the air conditioning pack 109 include an air conditioner (Air Cycle Machine) and a vapor compression refrigerator (Vapor Cycle System).

In the present embodiment, the gas turbine engines 101 are mounted on one airframe 102, and the compressed air supply systems 100 are located for the respective gas turbine engines 101. As with a general turbo fan engine, the gas turbine engine 101 according to the present embodiment includes a fan 103, a low-pressure compressor 104, a high-pressure compressor 105, a combustor 106, a high-pressure turbine 107, and a low-pressure turbine 108, which are located in this order from an upstream side toward a downstream side.

Moreover, the compressed air supply system 100 according to the present embodiment includes a low-pressure bleed air port 11, a high-pressure bleed air port 12, a main pipe 13, an auxiliary compressor 14, a precooler 15, a high-pressure bleed air pipe 16, a high-pressure bleed air valve 17, and circuitry 18. Hereinafter, these components will be described in order.

The low-pressure bleed air port 11 is a port that extracts the compressed air from an upstream side of the high-pressure compressor 105 of the gas turbine engine 101. In the present embodiment, the compressed air is extracted from a position between the low-pressure compressor 104 and the high-pressure compressor 105. However, the position from which the compressed air is extracted is not limited as long as the position is located upstream of the high-pressure compressor 105. For example, the compressed air may be extracted from a periphery of the fan 103.

The high-pressure bleed air port 12 is a port that extracts the compressed air from a downstream side of a front-stage portion of the high-pressure compressor 105 of the gas turbine engine 101. The high-pressure bleed air port 12 according to the present embodiment extracts the compressed air from a portion located downstream of the high-pressure compressor 105. Herein, the "front-stage portion of the high-pressure compressor 105" denotes a frontmost portion of the high-pressure compressor 105 when the high-pressure compressor 105 is divided into three parts in an axial direction. A mechanism that adjusts the angle of a vane (not shown) is located at the front-stage portion of the high-pressure compressor 105. Therefore, it is structurally difficult to extract the compressed air from the front-stage portion of the high-pressure compressor 105. The pressure of the compressed air extracted from the high-pressure bleed air port 12 is higher than the pressure of the compressed air extracted from the low-pressure bleed air port 11.

The main pipe 13 is a pipe extending from the low-pressure bleed air port 11 toward the air conditioning pack 109 of the airframe 102. To be specific, the compressed air extracted from the low-pressure bleed air port 11 flows through the main pipe 13 toward the air conditioning pack 109. A check valve 21 is located at a portion of the main pipe 13 which is located between the auxiliary compressor 14 and the precooler 15. The check valve 21 allows the flow in a direction from the low-pressure bleed air port 11 toward the precooler 15 but inhibits the flow in a direction from the precooler 15 toward the low-pressure bleed air port 11. Moreover, a low-pressure bleed air pressure gauge 22 is located at a portion of the main pipe 13 which is located between the low-pressure bleed air port 11 and the auxiliary compressor 14. The low-pressure bleed air pressure gauge 22 measures the pressure of the compressed air extracted from the low-pressure bleed air port 11. An auxiliary compressor outlet pressure gauge 23 is located at a portion of the main pipe 13 which is located between the auxiliary compressor 14 and the precooler 15. The auxiliary compressor outlet pressure gauge 23 measures outlet pressure of the auxiliary compressor 14. A main pipe outlet pressure gauge 24 is located at a downstream end portion of the main pipe 13. The main pipe outlet pressure gauge 24 measures outlet pressure of the main pipe 13.

The auxiliary compressor 14 is a device that is located at the main pipe 13 and increases the pressure of the compressed air. The type of the auxiliary compressor 14 is not especially limited. The auxiliary compressor 14 may be driven by acquiring power from the low-pressure compressor 104 of the gas turbine engine 101 or may be driven by acquiring power from the high-pressure compressor 105 of the gas turbine engine 101. For example, the auxiliary compressor 14 may be driven through a driver (as one example, a continuously variable transmission) that changes speed of driving force of a rotating shaft of the gas turbine engine 101 and outputs the driving force. Moreover, the auxiliary compressor 14 may be driven by acquiring power from an electric motor (not shown) or may be driven by utilizing high-pressure air. The auxiliary compressor 14 can be rotated at arbitrary rotational speed, and with this, can arbitrarily set the degree of pressure increase.

The precooler 15 is a device that cools the compressed air. The precooler 15 is located at a portion of the main pipe 13 which is located downstream of the auxiliary compressor 14. The precooler 15 according to the present embodiment cools the compressed air by heat exchange with outside air. The flow rate of the outside air flowing into the precooler 15 can be set arbitrarily, and with this, the degree of cooling can be set arbitrarily.

The high-pressure bleed air pipe 16 is a pipe that couples the main pipe 13 to the high-pressure bleed air port 12. The high-pressure bleed air pipe 16 according to the present embodiment couples the high-pressure bleed air port 12 to a portion of the main pipe 13 which is located upstream of the precooler 15 and downstream of the auxiliary compressor 14 and the check valve 21. To be specific, the compressed air extracted from the high-pressure bleed air port 12 flows through the high-pressure bleed air pipe 16 toward the main pipe 13. Moreover, a high-pressure bleed air valve outlet pressure gauge 25 is located at a portion of the high-pressure bleed air pipe 16 which is located between the high-pressure bleed air valve 17 and the main pipe 13. The high-pressure bleed air valve outlet pressure gauge 25 can measure outlet pressure of the high-pressure bleed air valve 17.

The high-pressure bleed air valve 17 is a valve located at the high-pressure bleed air pipe 16. The flow rate and pressure of the compressed air extracted from the high-pressure bleed air port 12 and supplied to the main pipe 13 can be adjusted by adjusting the opening degree of the high-pressure bleed air valve 17.

The circuitry 18 is a device that performs various control. The circuitry 18 includes a processor, a volatile memory, a non-volatile memory, an I/O interface, and the like. The non-volatile memory of the circuitry 18 stores various programs and data. The processor of the circuitry 18 performs calculation processing by using the volatile memory based on the programs stored in the non-volatile memory.

The circuitry 18 is electrically connected to the low-pressure bleed air pressure gauge 22, the auxiliary compressor outlet pressure gauge 23, the main pipe outlet pressure gauge 24, and the high-pressure bleed air valve outlet pressure gauge 25 and can acquire the pressure of the compressed air extracted from the low-pressure bleed air port 11, the outlet pressure of the auxiliary compressor 14, the outlet pressure of the main pipe 13, and the outlet pressure of the high-pressure bleed air valve 17. Moreover, the circuitry 18 is electrically connected to the high-pressure bleed air valve 17. The circuitry 18 can transmit a control signal to the high-pressure bleed air valve 17 to adjust the flow rate and pressure of the compressed air extracted from the high-pressure bleed air port 12 and supplied to the main pipe 13.

Moreover, the circuitry 18 receives various signals from the airframe 102. The signals transmitted from the airframe 102 include an abnormal signal. For example, when one of the gas turbine engines 101 mounted on the airframe 102 stops, the abnormal signal is transmitted from the airframe 102 to the circuitry 18.

Figure 2:
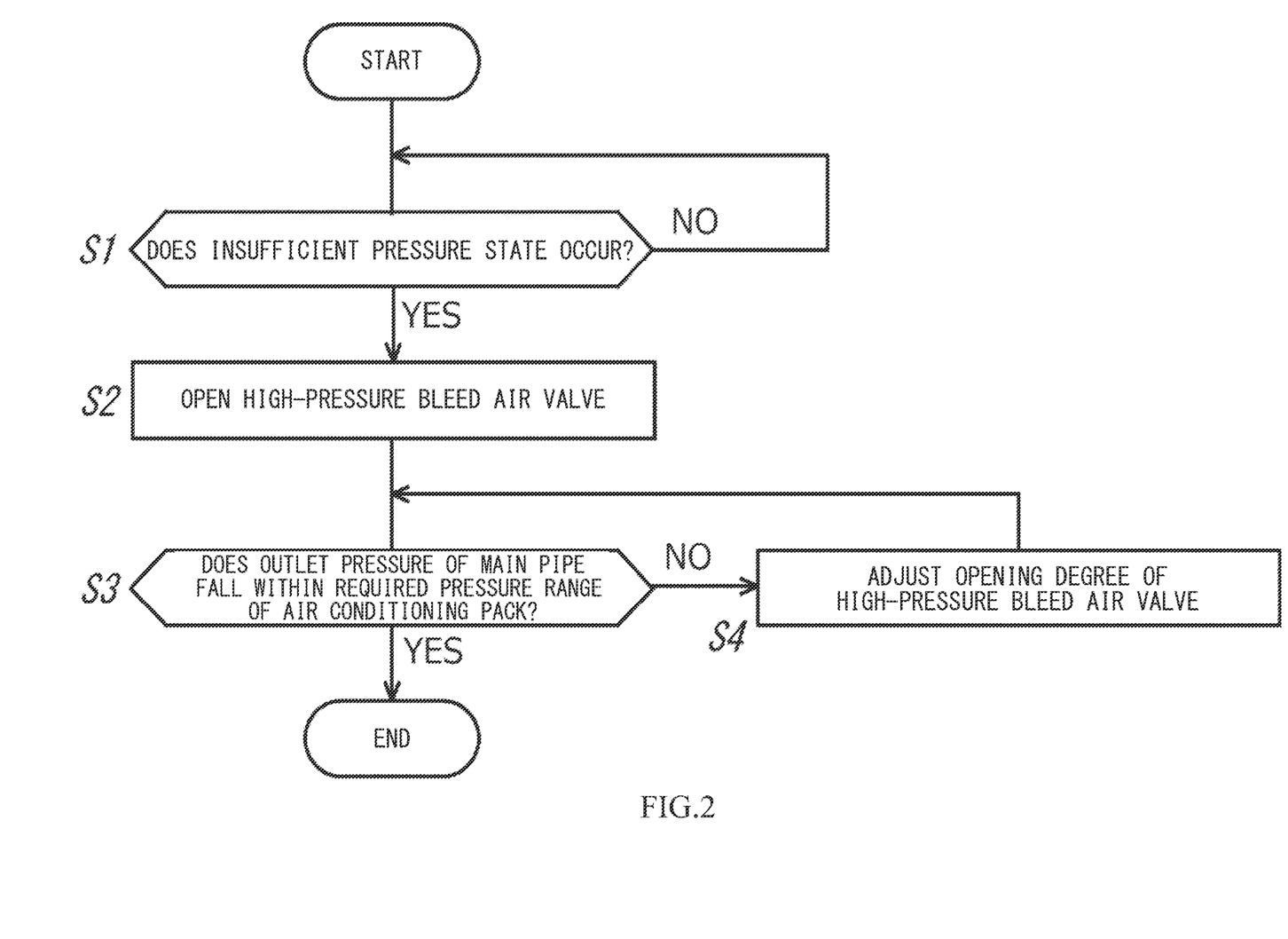
FIG. 2 is a flowchart of control performed by circuitry according to Embodiment 1.

FIG. 2 is a flowchart of the control performed by the circuitry 18 according to the present embodiment. This control is started with the high-pressure bleed air valve 17 closed. When the control is started, the circuitry 18 determines whether or not an insufficient pressure state occurs (Step S1).

The above "insufficient pressure state" denotes a state where with the high-pressure bleed air valve 17 closed, the outlet pressure of the main pipe 13 cannot maintain pressure within a required pressure range of the air conditioning pack 109. The required pressure range corresponds to pressure required to maintain aircraft internal pressure and drive the air conditioning pack 109. The required pressure range is, for example, 1 to 3 atmospheric pressure. When the compressed air having pressure within the required pressure range is supplied from the compressed air supply system 100 to the air conditioning pack 109, the air conditioning pack 109 can adjust the pressure of the compressed air to appropriate pressure and supply the compressed air to the passenger room. Moreover, a case where "the outlet pressure of the precooler 15 cannot maintain pressure within the required pressure range of the air conditioning pack 109" includes a case where when disturbance that is assumed to occur is input, the outlet pressure of the main pipe 13 falls outside the required pressure range of the air conditioning pack 109. To be specific, the above case includes a case where the auxiliary compressor 14 cannot operate while having some room with respect to the required pressure range of the air conditioning pack 109.

For example, when one of the gas turbine engines 101 mounted on the airframe 102 stops, the required pressure ranges of the compressed air supply systems 100 for the other gas turbine engines 101 shift in an increase direction. In this case, the insufficient pressure state with respect to the compressed air supply system 100 occurs. Then, in the present embodiment, the circuitry 18 determines that the insufficient pressure state occurs when the circuitry 18 receives from the airframe 102 the abnormal signal that is transmitted when one of the gas turbine engines 101 stops.

Moreover, at the time of, for example, idling or descending in which the rotational speed of the engine decreases, the pressure of the compressed air flowing into the auxiliary compressor 14 decreases. In this case, the insufficient pressure state occurs. Therefore, in the present embodiment, the circuitry 18 determines that the insufficient pressure state occurs when the pressure of the compressed air extracted from the low-pressure bleed air port 11 falls below predetermined lower limit input pressure. The pressure of the compressed air extracted from the low-pressure bleed air port 11 can be acquired from the low-pressure bleed air pressure gauge 22.

When the circuitry 18 determines in Step S1 that the insufficient pressure state does not occur (No in Step S1), the circuitry 18 repeats Step S1. In contrast, when the circuitry 18 determines in Step S1 that the insufficient pressure state occurs (Yes in Step S1), the circuitry 18 opens the high-pressure bleed air valve 17 (Step S2). By opening the high-pressure bleed air valve 17, the compressed air which is extracted from the high-pressure bleed air port 12 and has relatively high pressure is supplied to the main pipe 13. As a result, the insufficient pressure state is resolved, and the compressed air having appropriate pressure can be supplied to the airframe 102.

After Step S2 described above, the circuitry 18 determines whether or not the outlet pressure of the main pipe 13 fall within the required pressure range of the air conditioning pack 109 (Step S3). The outlet pressure of the main pipe 13 can be acquired from the main pipe outlet pressure gauge 24.

When the circuitry 18 determines that the outlet pressure of the main pipe 13 falls within the required pressure range of the air conditioning pack 109 (Yes in Step S3), the circuitry 18 terminates the control. In contrast, when the circuitry 18 determines that the outlet pressure of the main pipe 13 does not fall within the required pressure range of the air conditioning pack 109 (No in Step S3), the circuitry 18 adjusts the opening degree of the high-pressure bleed air valve 17 (Step S4). For example, when the outlet pressure of the main pipe 13 falls below the required pressure range of the air conditioning pack 109, the circuitry 18 increases the opening degree of the high-pressure bleed air valve 17 to increase the outlet pressure of the main pipe 13.

After Step S4, the circuitry 18 repeats Steps S3 and S4 to adjust the opening degree of the high-pressure bleed air valve 17 until the outlet pressure of the main pipe 13 falls within the required pressure range of the air conditioning pack 109. The circuitry 18 terminates the control when the outlet pressure of the main pipe 13 falls within the required pressure range of the air conditioning pack 109.

Embodiment 2

Figure 3:
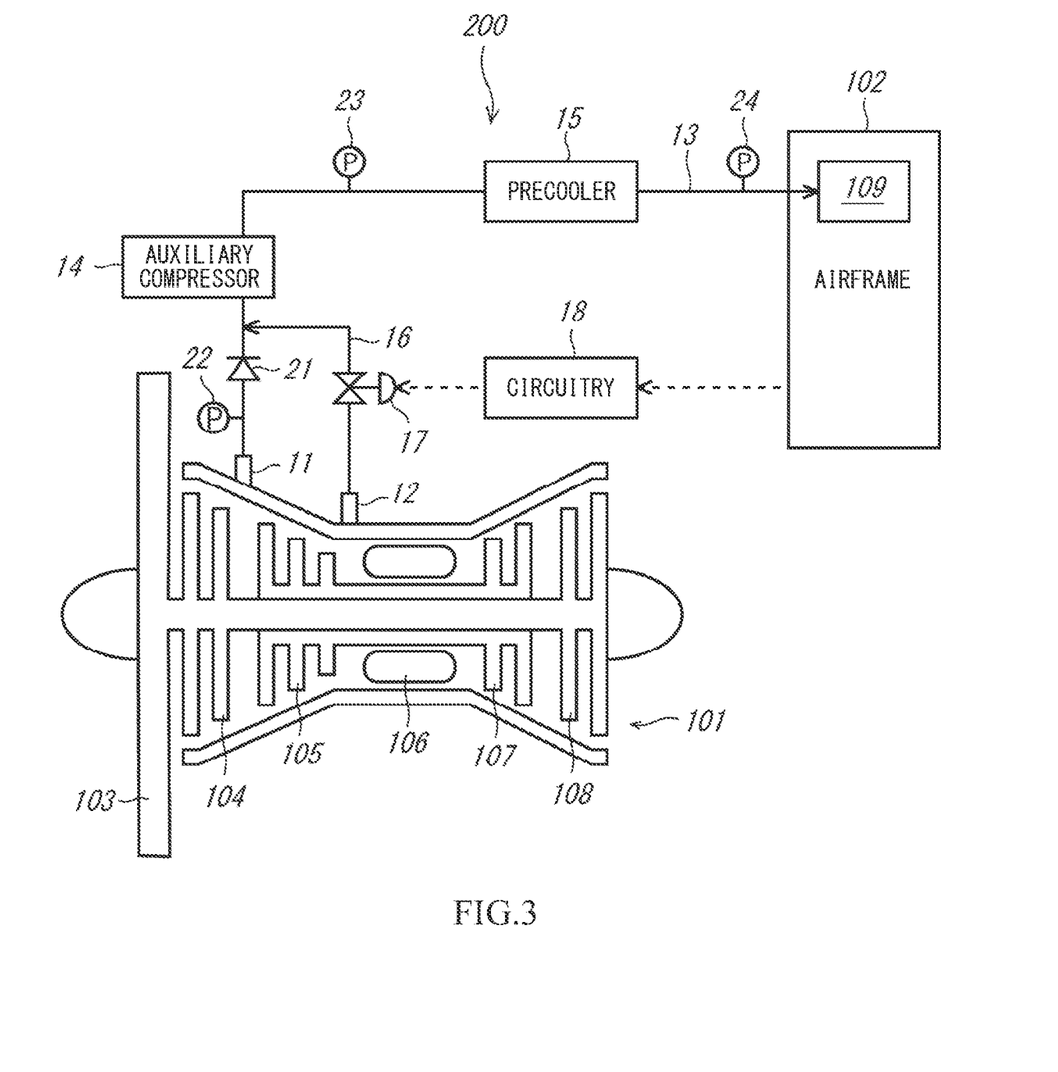
FIG. 3 is a schematic diagram showing the compressed air supply system according to Embodiment 2.

Next, a compressed air supply system 200 according to Embodiment 2 of the present disclosure will be described. FIG. 3 is a schematic diagram showing the compressed air supply system 200 according to Embodiment 2. As shown in FIG. 3, the compressed air supply system 200 according to the present embodiment is different from the compressed air supply system 100 according to Embodiment 1 regarding the arrangement of the high-pressure bleed air pipe 16 and the check valve 21. The other components of the compressed air supply system 200 according to Embodiment 2 are the same as those of the compressed air supply system 100 according to Embodiment 1.

Specifically, the high-pressure bleed air pipe 16 according to the present embodiment couples the high-pressure bleed air port 12 to a portion of the main pipe 13 which is located downstream of the low-pressure bleed air port 11 and upstream of the auxiliary compressor 14. Moreover, the check valve 21 according to the present embodiment is located at a portion of the main pipe 13 which is located downstream of the low-pressure bleed air port 11 and upstream of the portion to which the high-pressure bleed air pipe 16 is connected. Therefore, the compressed air extracted from the high-pressure bleed air port 12 can be prevented from flowing to the low-pressure bleed air port 11. However, in the present embodiment, when the high-pressure bleed air valve 17 opens, only the compressed air extracted from the high-pressure bleed air port 12 is supplied to an inlet of the auxiliary compressor 14. Even in this case, the insufficient pressure state is resolved, and the compressed air having appropriate pressure can be supplied to the airframe 102. A control valve may be located instead of the check valve 21 at the main pipe 13, and the compressed air extracted from the high-pressure bleed air port 11 and the compressed air extracted from the low-pressure bleed air port 13 may be mixed with each other and introduced to the auxiliary compressor 14.

Embodiment 3

Figure 4:
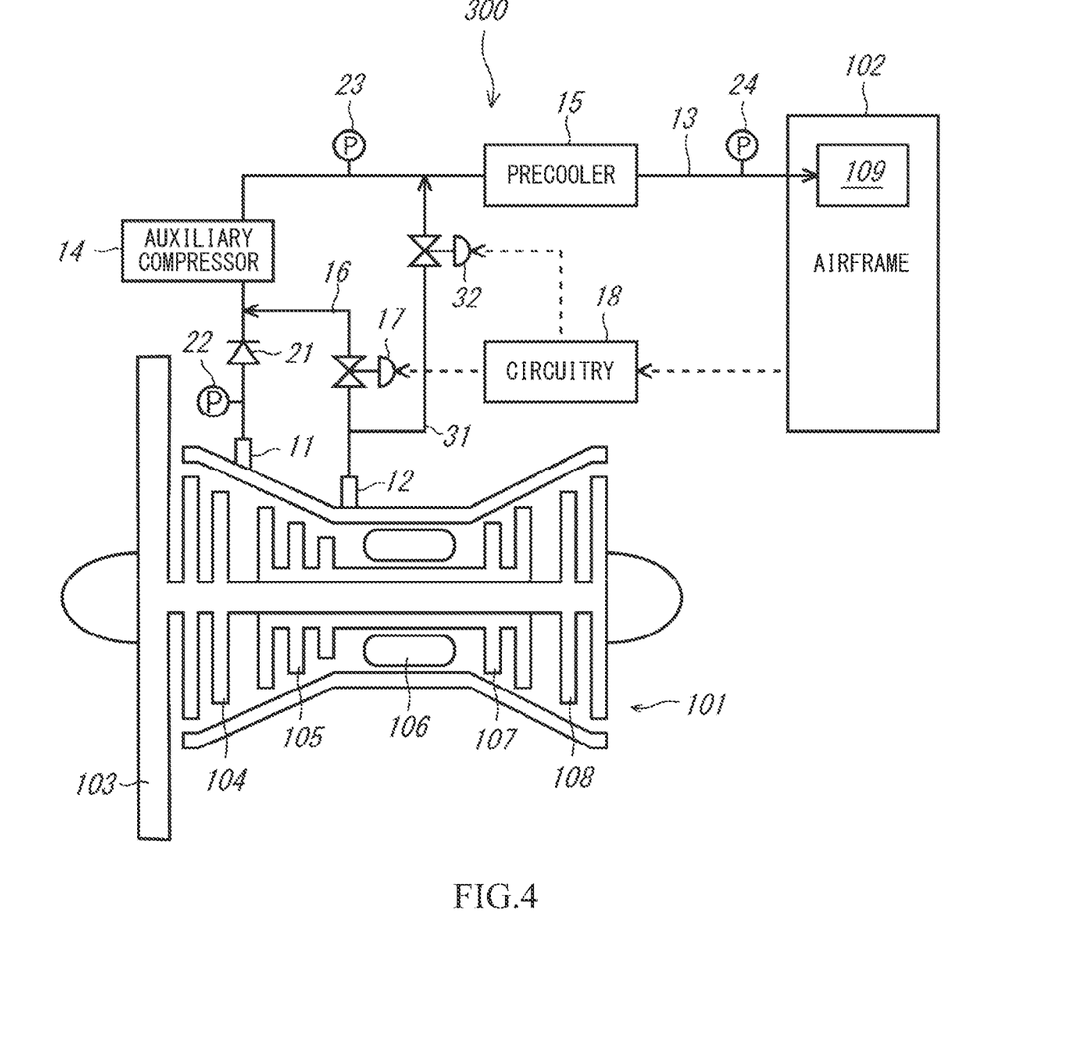
FIG. 4 is a schematic diagram showing the compressed air supply system according to Embodiment 3.

Next, a compressed air supply system 300 according to Embodiment 3 of the present disclosure will be described. FIG. 4 is a schematic diagram showing the compressed air supply system 300 according to Embodiment 3. As shown in FIG. 4, the compressed air supply system 300 according to the present embodiment is different from the compressed air supply system 200 according to Embodiment 2 in that the compressed air supply system 300 according to the present embodiment includes a bypass pipe 31 and a bypass valve 32. The other components of the compressed air supply system 300 according to Embodiment 3 are the same as those of the compressed air supply system 200 according to Embodiment 2.

The bypass pipe 31 is a pipe that bypasses the auxiliary compressor 14 and supplies the compressed air, extracted from the high-pressure bleed air port 12, to the main pipe 13. The bypass pipe 31 couples a portion of the main pipe 13 which is located upstream of the precooler 15 and downstream of the auxiliary compressor 14 to a portion of the high-pressure bleed air pipe 16 which is located upstream of the high-pressure bleed air valve 17.

The bypass valve 32 is located at the bypass pipe 31. The bypass valve 32 is electrically connected to the circuitry 18 and receives the control signal from the circuitry 18. When the bypass valve 32 receives the control signal from the circuitry 18, the bypass valve 32 opens or closes.

Figure 5:
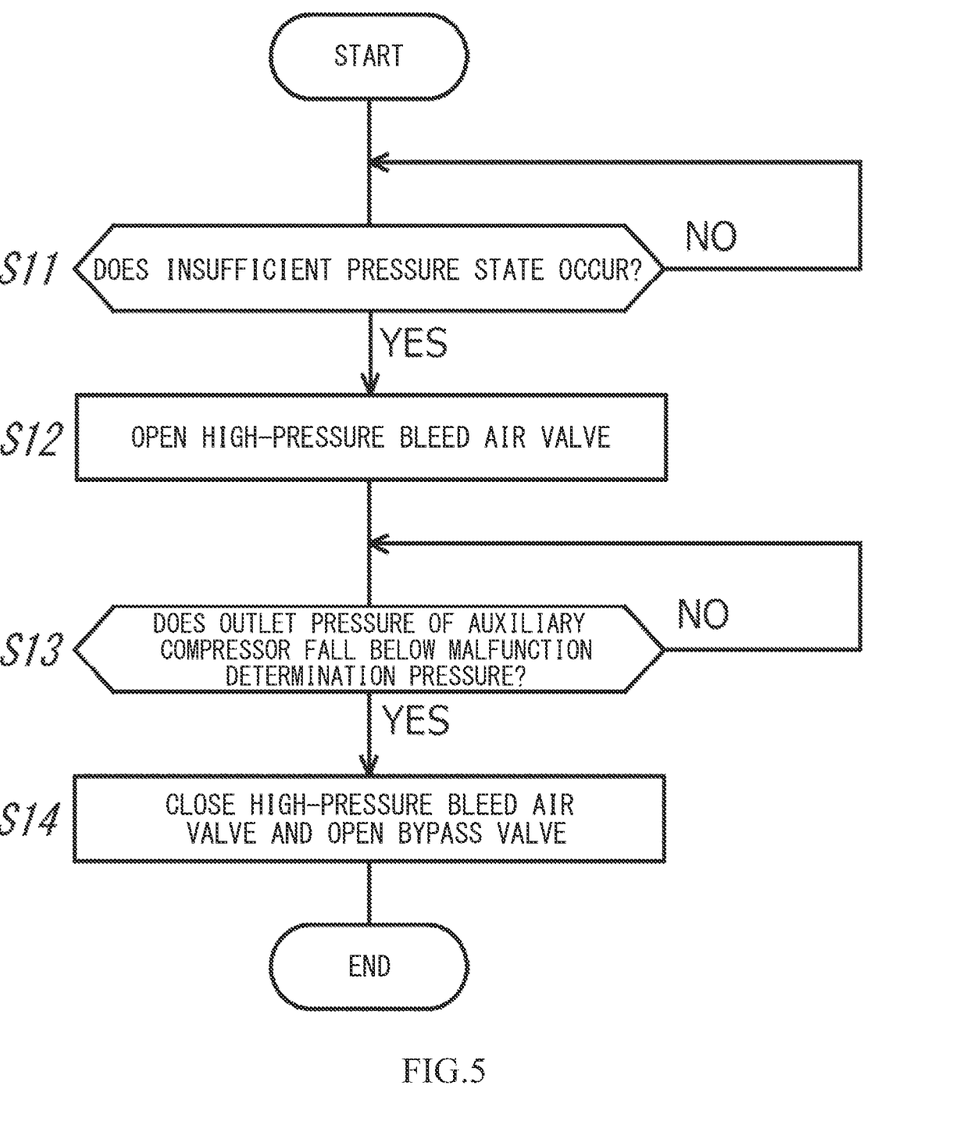
FIG. 5 is a flowchart of the control performed by the circuitry according to Embodiment 3.

FIG. 5 is a flowchart of the control performed by the circuitry 18 according to Embodiment 3. This control is started with the high-pressure bleed air valve 17 and the bypass valve 32 closed. In the present embodiment, when the control is started, the circuitry 18 determines whether or not the insufficient pressure state occurs (Step S11). When the circuitry 18 determines that the insufficient pressure state occurs, the circuitry 18 opens the high-pressure bleed air valve 17 (Step S12). These steps are the same as Steps S1 and S2 described in Embodiment 1.

Next, in Step S13, the circuitry 18 determines whether or not the outlet pressure of the auxiliary compressor 14 falls below predetermined malfunction determination pressure. When the outlet pressure of the auxiliary compressor 14 falls below the malfunction determination pressure, the possibility of the malfunction of the auxiliary compressor 14 or its peripheral device is high.

When the circuitry 18 determines that the outlet pressure of the auxiliary compressor 14 falls below the malfunction determination pressure (Yes in Step S13), the circuitry 18 closes the high-pressure bleed air valve 17 and opens the bypass valve 32. With this, the compressed air extracted from the high-pressure bleed air port 12 bypasses the auxiliary compressor 14 and is supplied to the main pipe 13. As a result, even when the auxiliary compressor 14 or its peripheral device malfunctions, the compressed air supply system 100 can supply the compressed air having relatively high pressure to the airframe 102. When the circuitry 18 determines that the outlet pressure of the auxiliary compressor 14 does not fall below the malfunction determination pressure (No in Step S13), the circuitry 18 repeats Step S13.

Operational Advantages, Etc.

As described above, a compressed air supply system according to each embodiment is a compressed air supply system that extracts compressed air from a gas turbine engine and supplies the compressed air to an air conditioning pack of an airframe. The compressed air supply system includes: a low-pressure bleed air port that extracts the compressed air from an upstream side of a high-pressure compressor; a high-pressure bleed air port that extracts the compressed air from a downstream side of a front-stage portion of the high-pressure compressor; a main pipe extending from the low-pressure bleed air port toward the air conditioning pack; an auxiliary compressor that is located at the main pipe and increases pressure of the compressed air; a high-pressure bleed air pipe that couples the main pipe to the high-pressure bleed air port; a high-pressure bleed air valve located at the high-pressure bleed air pipe; and circuitry that opens the high-pressure bleed air valve when the circuitry determines that an insufficient pressure state occurs, the insufficient pressure state being a state where with the high-pressure bleed air valve closed, outlet pressure of the main pipe is not maintained within a required pressure range of the air conditioning pack.

According to this configuration, when it is determined that the insufficient pressure state occurs, the high-pressure bleed air valve is open, and the compressed air having high pressure is introduced. With this, the pressure of the compressed air supplied by the compressed air supply system can be maintained within an appropriate range. Therefore, according to the above configuration, the auxiliary compressor does not have to have pressure-increase performance that can deal with any situation, and therefore, the size of the auxiliary compressor can be suppressed.

Moreover, in the compressed air supply system according to each embodiment, when the pressure of the compressed air extracted from the low-pressure bleed air port falls below predetermined lower limit input pressure, the circuitry determines that the insufficient pressure state occurs, and the circuitry opens the high-pressure bleed air valve.

According to this configuration, whether or not the insufficient pressure state occurs can be easily determined. As a result, the high-pressure bleed air valve can open at appropriate timing.

Moreover, in the compressed air supply system according to each embodiment, when the circuitry receives a predetermined abnormal signal from the airframe, the circuitry determines that the insufficient pressure state occurs, and the circuitry opens the high-pressure bleed air valve.

According to this configuration, whether or not the insufficient pressure state occurs can be easily determined. As a result, the high-pressure bleed air valve can open at appropriate timing.

Moreover, in the compressed air supply system according to Embodiment 1, the high-pressure bleed air pipe couples the high-pressure bleed air port to a portion of the main pipe which is located downstream of the auxiliary compressor.

According to this configuration, when the insufficient pressure state occurs, the compressed air having high pressure is introduced into the compressed air supply system. With this, the pressure of the compressed air supplied by the compressed air supply system can be maintained within an appropriate range.

Moreover, in the compressed air supply system according to Embodiment 1, the circuitry adjusts an opening degree of the high-pressure bleed air valve such that the outlet pressure of the main pipe falls within the required pressure range of the air conditioning pack.

According to this configuration, the compressed air supply system can supply the compressed air having appropriate pressure to the air conditioning pack.

Moreover, in the compressed air supply system according to each of Embodiments 2 and 3, the high-pressure bleed air pipe couples the high-pressure bleed air port to a portion of the main pipe which is located downstream of the low-pressure bleed air port and upstream of the auxiliary compressor.

According to this configuration, when the insufficient pressure state occurs, the compressed air having high pressure is introduced into the compressed air supply system. With this, the pressure of the compressed air supplied by the compressed air supply system can be maintained within an appropriate range.

Moreover, the compressed air supply system according to Embodiment 3 includes: a bypass pipe that couples a portion of the main pipe which is located upstream of the precooler and downstream of the auxiliary compressor to a portion of the high-pressure bleed air pipe which is located upstream of the high-pressure bleed air valve; and a bypass valve located at the bypass pipe. In a case where outlet pressure of the auxiliary compressor falls below predetermined malfunction determination pressure when the circuitry opens the high-pressure bleed air valve, the circuitry closes the high-pressure bleed air valve and opens the bypass valve.

According to this configuration, even when the auxiliary compressor or its peripheral device malfunctions, the compressed air supply system can supply the compressed air having relatively high pressure to the airframe.

The invention claimed is:

1. A compressed air supply system that extracts compressed air from a gas turbine engine and supplies the compressed air to an air conditioning pack of an airframe, the compressed air supply system comprising:
   a low-pressure bleed air port that extracts the compressed air from an upstream side of a high-pressure compressor;
   a high-pressure bleed air port that extracts the compressed air from a downstream side of a front-stage portion of the high-pressure compressor;
   a main pipe extending from the low-pressure bleed air port toward the air conditioning pack;
   an auxiliary compressor that is located at the main pipe and increases pressure of the compressed air;
   a high-pressure bleed air pipe that couples the high-pressure bleed air port to a portion of the main pipe which is located downstream of the low-pressure bleed air port and upstream of the auxiliary compressor;
   a high-pressure bleed air valve located at the high-pressure bleed air pipe upstream of the main pipe;
   a control valve located at a portion of the main pipe which is located downstream of the low-pressure bleed air port and upstream of the portion of the main pipe to which the high-pressure bleed air pipe is connected, the control valve mixing the compressed air extracted from the high-pressure bleed air port and the compressed air extracted from the low-pressure bleed air port and introducing the compressed air to the auxiliary compressor;
   a bypass pipe that couples a portion of the main pipe which is located downstream of the auxiliary compressor to a portion of the high-pressure bleed air pipe which is located upstream of the high-pressure bleed air valve; and
   circuitry that opens the high-pressure bleed air valve when the circuitry determines that an insufficient pressure state occurs, the insufficient pressure state being a state where with the high-pressure bleed air valve closed, outlet pressure of the main pipe is not maintained within a required pressure range of the air conditioning pack.

2. The compressed air supply system according to claim 1, wherein when the pressure of the compressed air extracted from the low-pressure bleed air port falls below predetermined lower limit input pressure, the circuitry determines that the insufficient pressure state occurs, and the circuitry opens the high-pressure bleed air valve.

3. The compressed air supply system according to claim 1, wherein when the circuitry receives a predetermined abnormal signal from the airframe, the circuitry determines that the insufficient pressure state occurs, and the circuitry opens the high-pressure bleed air valve.

4. The compressed air supply system according to claim 1, comprising:
   a precooler that cools the compressed air and is located at a portion of the main pipe which is located downstream of the auxiliary compressor;
and a
   bypass valve located at the bypass pipe, wherein
   in a case where outlet pressure of the auxiliary compressor falls below predetermined malfunction determination pressure when the circuitry opens the high-pressure bleed air valve, the circuitry closes the high-pressure bleed air valve and opens the bypass valve, and wherein
   the portion of the main pipe that is located downstream of the auxiliary compressor is located upstream of the pre-cooler.

* * * * *